May 3, 1927.

M. V. PRESTON 1,627,062

PATTERN GRADING MACHINE

Filed Nov. 23, 1922

INVENTOR
Marshall V. Preston.

by Wright, Brown, Quinby & May
Att'ys

May 3, 1927.
M. V. PRESTON
1,627,062
PATTERN GRADING MACHINE
Filed Nov. 23, 1922 2 Sheets-Sheet 2
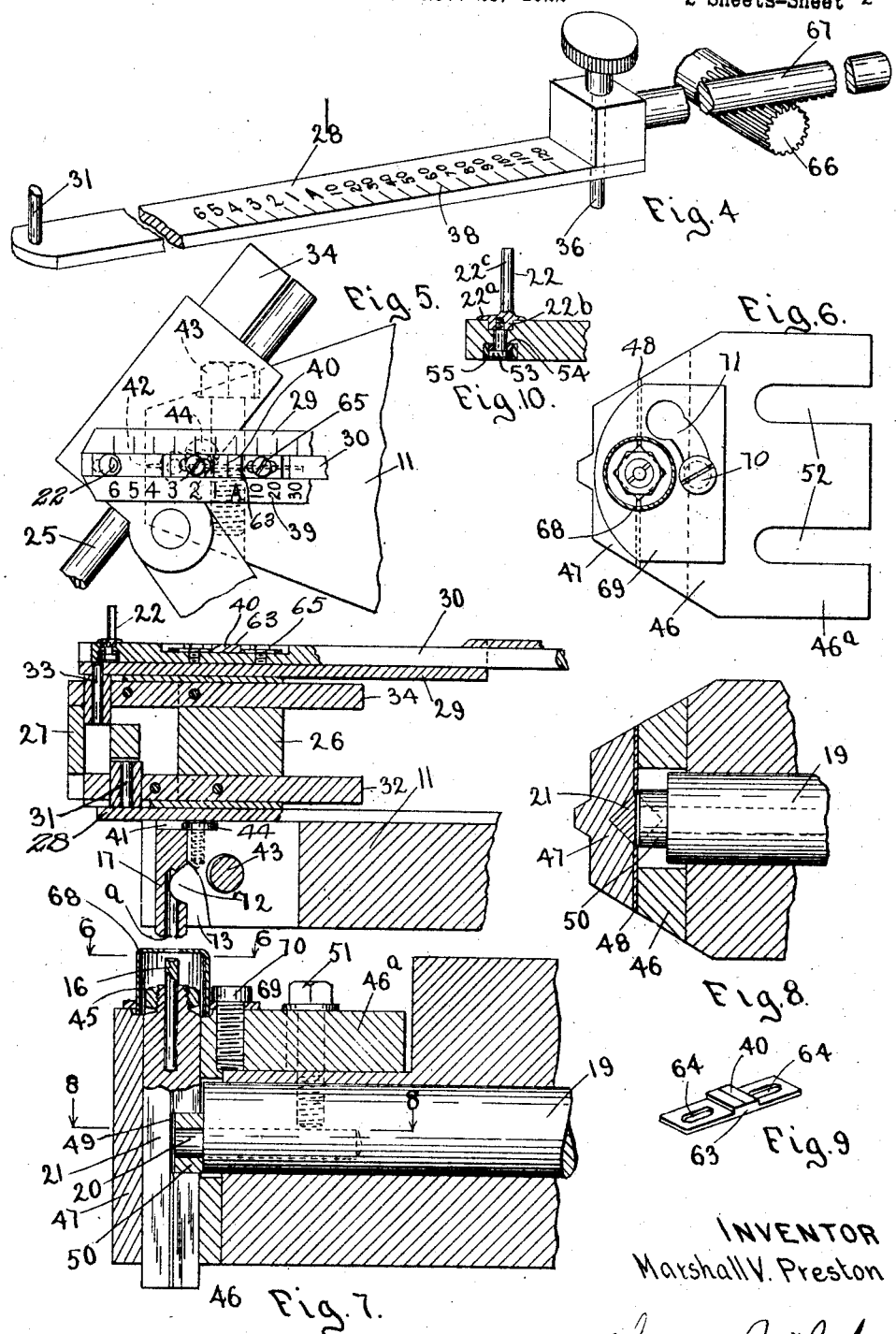
INVENTOR
Marshall V. Preston Patented May 3, 1927.

1,627,062

UNITED STATES PATENT OFFICE.

MARSHALL V. PRESTON, OF BOSTON, MASSACHUSETTS.

PATTERN-GRADING MACHINE.

Application filed November 23, 1922. Serial No. 602,742.

This invention relates to machines for grading and cutting patterns, such as are used in the manufacture of boots and shoes for cutting out the pieces of leather, cloth and the like of which the shoe uppers and the linings therefor are constructed. I have applied the improvements in which my present invention consists to the type of machine known as the "Preston grader" which is disclosed and explained in Letters Patent of the United States to Albert F. Preston, No. 951,886 dated March 5, 1910, and 1,105,534, dated July 28, 1914, wherefore I have illustrated in this specification so much of a machine of that type as is necessary to explain the construction, function and utility of such improvements. It may be noted, however, that the embodiment thus effected and the description thereof in association with that particular machine do not necessarily limit the scope in which I claim protection of these improvements, but such protection extends to the novel characteristics and steps hereinafter pointed out, so far as the same are applicable to other types of machine and so far as they are useful in other environments.

The objects which I have had in view are, among others, to provide an improved means of detachably mounting the complemental cutting instruments of a grading machine in a manner permitting one of the cutters to be adjusted and accurately alined with the other cutter, and to be readily removed and replaced; to provide a simplified and less expensive construction of cutter carrying slide or block than has been used heretofore, together with means for adjustment to compensate for the effects of wear; to provide in connection with a shiftable guide for the model pattern, adjustable means for instantly and accurately locating such guide in prescribed positions when shifted, to the end that, during the cutting of a single pattern, the proportional enlargement or reduction from the model may be temporarily discontinued and a strip of given width be added to or removed from the pattern being cut; to provide means by which the index mark on the bar which carries the guide for the model pattern may be accurately adjusted; to apply a punch and a die as the cutting instruments of a grading machine of the Preston type, while at the same time avoiding error, due to the diameter of the punch in the graded pattern; and to provide a swivel guide for the model pattern in order to enable accurate grading to be accomplished, even though the edge of the model which makes contact with the guide lies and moves in directions varying more or less in angular relation to the center line of the machine.

The precise nature of these improvements and the principles and characteristics embodied in them for which I desire protection are explained in the following specification with reference to the drawings.

In the drawings,—

Figure 4 is a perspective view of another part of the guiding or gage part of the grading mechanism.

Figure 5 is a plan view of the model guide and its gaging indices, together with adjacent parts of the grading mechanism.

Figure 6 is a plan view of the removable and adjustable punch holder and guide.

Figure 7 is an enlarged sectional view on the same plane of section as Figure 2, but showing principally the punch and die with the means for mounting and adjusting them.

Figure 8 is a cross section on line 8—8 of Figure 7.

Figure 9 is a perpsective view of the adjustable index mark for the model pattern guide.

Figure 10 is a fragmentary sectional view showing the mounting for the pattern guide.

Figure 1:
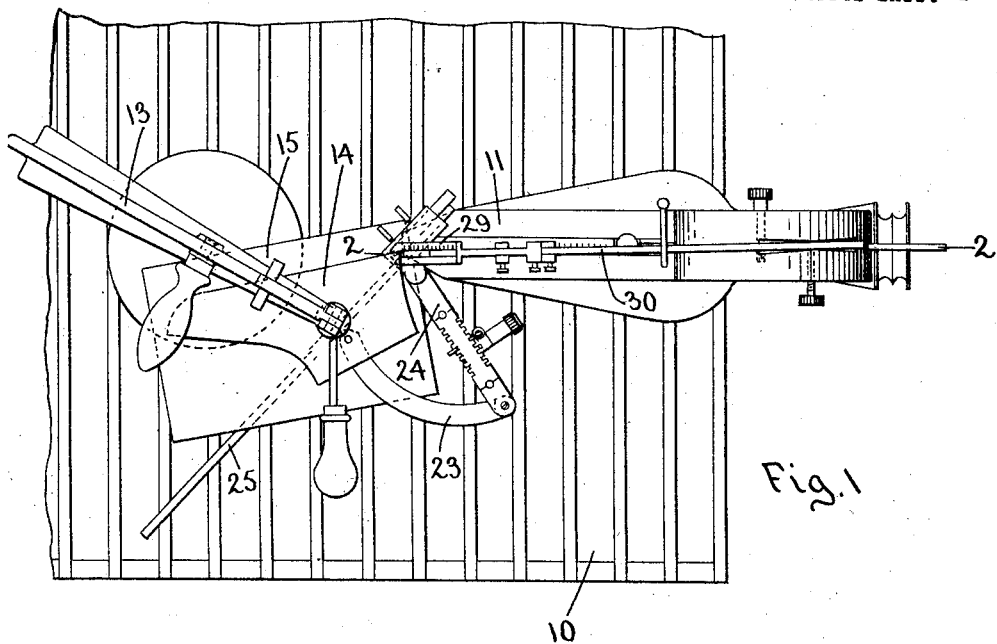
Figure 1 is a plan view of a Preston pattern grading machine in which I have embodied the present invention.
Figure 3:
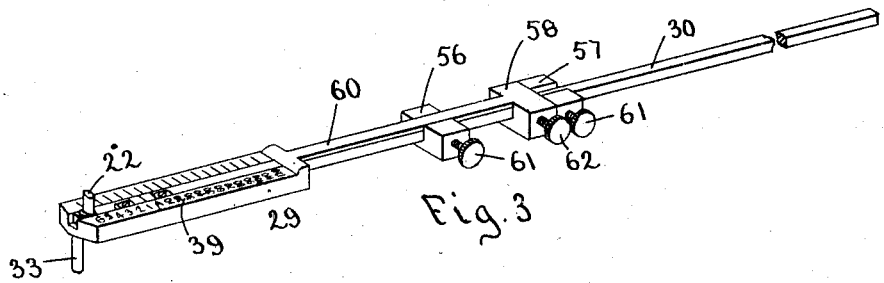
Figure 3 is a perspective view of the means by which I am enabled to effect immediate changes in the grade of the pattern being produced.

A full disclosure of the purpose, principles and mechanical details of the Preston grading machine is given by the aforesaid Preston Patent No. 1,105,534, dated July 28, 1914, and it is not necessary to repeat the same in this specification. In the accompanying drawings I have shown enough of the prior machine to illustrate fully the manner in which the improvements of the present invention have been applied thereto, and no further description of said machine is required than virtually an identifying catalogue of the parts thereof which I have shown in these drawings.

Referring to the drawings, 10 represents a table or bed to which the cutter head 11 is secured and on which rests movably a jack 13 carrying a model pattern 14 and a sheet of stock 15 from which a graded pattern is to be cut generally similar to the model, but permissibly embodying variations in ratio as to different dimensions. A punch 16 and die 17 (see particularly Figure 7) are the cooperating cutters which cut out the pattern made from the sheet of stock 15. These cutting elements are mounted on two different parts of the head which are separated from one another by a deep slot 18 adapted to receive the projecting parts of the stock or model blank 15. A shaft 19 carries an eccentric pin 20 which reciprocates a bar or slide 21 carrying the punch.

The stock is guided, in being moved past the cutters, by the edge of the model 14 moving in contact with a guide pin or gage 22 which is coupled both to the cutter head and to the jack by a proportional motion mechanism or pantograph. This linkage consists of a bar 23 pivotally connected to the jack, a link 24, and a rod 25. The link is pivoted to a block 26 and has a connection with a second block 27 of such character that when oscillated about its pivot connection with the block 26, it moves the block 27 proportionally to movement of the jack toward or away from the cutter head. The rod 25 is simply a guide which is fixed to the block 26 and passes through a guideway in a part of the jack and on which the block 27 is adapted to slide. It establishes what may be called the base line of the proportional motion mechanism, and may be swung to any angle, within wide limits, with the center line of the cutter head. Such center line is approximately in the line 2—2 of Figure 1.

Either one of the blocks 26 or 27 may be alternatively connected to the cutter head 11 by means of a slide 28, and the other block may at the same time be connected with the model guide 22 by means of a holder 29 and a rod 30. The slide 28 is pivoted, by means of a pin 31, to a bar 32 which passes through guideways in both the blocks 26 and 27, and the holder 29 is connected by means of a pivot 33 with a bar 34 similar to the bar 32 and which is similarly contained in guideways in said blocks. Either bar 32 or 34 may be connected to either block and released from the other in the manner explained in the foregoing Preston patent, in order to enable the machine to produce graded patterns either larger or smaller than the model, or of the same size.

The slide 28 can be shifted endwise in an appropriately formed guideway in the cutter head, and held there by a locking pin 36 entering any one of a number of holes 37 in the head, and the rod 30 may be shifted endwise in the holder 29, these shifts being effected for the purpose of causing proportional enlargement or reduction of the pattern being made, to be graded from a line more or less distant from the edges of the model, either inside or outside of such edges. The extent of the adjustments so made are indicated by graduations on the slide 28 and shown at 38 in Figure 4, cooperating with an index on the cutter head; and by graduations 39 on the holder 29 in cooperation with an index mark 40 on the rod 30.

As thus far described, and except for the punch and die cutting mechanism, the machine does not differ substantially from the Preston grading machine described in the aforesaid patent. I will now describe the improvements which constitute the present invention.

First, the complemental cutting means or elements and the provisions for mounting them adjustably and detachably:—These parts are shown best in Figures 6, 7 and 8. The stationary cutting member, in this case the die 17, is held in a socket 41 in the upper arm of the cutter head. This arm is slotted from its end inward as indicated at 42 by dotted lines in Figure 5, the slot crossing the socket 41. A clamp screw 43 is provided to grip the jaws formed by the slot 42 against the die, in a well known manner. A screw 44 may be mounted in one of the die-gripping jaws with its head overlapping the upper end of the die to serve as an abutment resisting its displacement under the thrust of the punch applied in cutting the interposed stock.

The reciprocating cutting element, in this machine the punch 16, is mounted in the carrier 21 so that it protrudes from one end thereof, and the end of the carrier from which the punch so protrudes is reduced in diameter and formed as a chuck with jaws which are gripped upon the punch by an externally applied nut 45, or equivalent squeezing means. An adjustable holder and guide for the punch carrier is formed by an L-shaped or angle piece 46, and a cover plate 47, which have complemental grooves forming a guideway for the punch carrier. This carrier is economically made from bar stock, preferably square in section, wherefore the grooves forming this guideway may be V-shaped, and the carrier is held in them with one of its diagonals in the center line of the cutter head. The cover plate is detachably applied to the holder 46, and between it and the latter may be placed shims 48 of greater or less thickness so as to permit adjustment of the guideway to fit the punch carrier without looseness and to take up wear. In the angle of the carrier which extends toward the rear is formed a notch 49 into which projects the eccentric pin 20 of the driving shaft, such pin preferably carrying a roller 50 through which actual engagement with the carrier is made.

The angular or L-shaped holder 46 has a laterally extending plate or portion 46ª which rests on the frame of the cutter head and is secured thereto by screws 51 passing through slots 52 and adapted to clamp the holder 46 adjustably to the cutter head. The adjustment permitted by this mode of clamping enables the punch to be alined accurately with the die. Thus the punch may be made to fit closely in the die and any bending or warping of the punch which might occur from hardening can be compensated for by this adjustment, and the punch centered accurately, without liability of the punch striking the die at one side and being rapidly dulled on its edge. As the slots moreover extend in parallel to the rear edge of the plate 46, the entire punch holder can be readily removed from the machine, and replaced by simply loosening the clamp screws and without need of wholly removing them.

The characteristic just previously described of providing the punch carrier with chuck jaws for holding the punch enables the punch to be adjusted endwise as its cutting end is ground away in sharpening. I am able by this means to furnish punches in the first instance which are so long that a very considerable part of their length can be gradually taken off by repeated grindings before the usefulness of the punch is destroyed. At no time, however, even when the punch is new and of the maximum length, is it necessary for the punch to enter the die more than by the slight overlap required to sever the stock fully and cleanly, while after its length has been reduced by grinding it may be adjusted in the chuck to enter the die by the same amount.

The frictional grip of the jaws on the punch is sufficient with most kinds of pattern stock to prevent displacement, even though the lower end of the punch does not reach the bottom of its socket in the carrier; but if necessary to insure absolutely against displacement when cutting excessively hard stock, such as sheet metal, I may place bottom plugs of required lengths in the socket under the punch to support it positively when its length has been thus reduced. In any case the chuck jaws hold the punch firmly against any lateral displacement of its cutting end.

All these adjustments may also be used with cutters of the chisel type in cooperation with a complemental cutter having a straight edge, that is, cutters of the sort shown in the prior Preston patents aforesaid, which may be preferred for cutting patterns from sheet metal. With cutters of this type the capacity for adjustment given by the holder 46 is of especial importance, for any errors in position of the chisel edge of the cutter, due to distortion in hardening, may be compensated for and the cutter very quickly and accurately adjusted by placing its forward side against the rear side of the complemental cutter, when advanced to the extreme of its cutting stroke, and then tightening the clamp screws 51.

A characteristic of the Preston grading machine as heretofore made is that the cooperating edges of the cutters meet in an exact point, with reference to which the proportional motion of the pattern guide has its point of departure. In other words, the fixed pivot of the pantograph mechanism is either at the tangent point between the cutters, or is displaced more or less therefrom by definite known amounts. This condition leads to accuracy in the result because the outline cut in the work is thereby made exactly proportional in the desired ratio to either the outline of the model or to any selected tangent line within or outside of such model. With the punch and die cutting mechanism applied by this invention to the machine, the same condition is preserved, because the stationary pivot point of the pantograph mechanism, formed by the pin 31, is placed with its axis in alinement with a selected point in the edge of the die when set for grading from the edges of the model. This selected point is, in the machine here shown, the outermost or foremost point, that is, the point which defines the outline of the finished work. In the drawing it is at the intersection between the longitudinal center line 2—2 and the left hand side of the circular cutting edge with reference to these drawings. That point is noted at a in Figure 7.

The guiding element of the model guide 22 is likewise combined with the same point of the cutting edge when the model and the work are of the same size, wherefore the displacement of the model guide by the proportional motion mechanism, when enlarged or reduced patterns are being made, causes the proportional enlargement or reduction to be made with respect to this point. Relatively the same effect occurs when the pivots and guide are displaced in order to grade the work piece from imaginary lines within or outside of the outline of the model, because the displacement of such pivots and guide are made by exact definite amounts from the same point. Thus the outline of the work piece cut by this machine is graded with reference to that point in the edge of punch and die which defines or forms such outline, and not to the axis of the die, wherefore it is accurate, and an inaccuracy of fixed amount in all graded patterns, equal to the radius of the die, is avoided.

The model guide 22 itself embodies an improvement in that it is swiveled and has a contact face which passes through the prolongation of the swiveling axis, such axis having the relation to the reference point in the cutting edge hereinbefore explained. The details of construction by which it is so held are shown in Figure 7. The guide itself is an upright post having a flange 22ª which rests on the bar 29, and a cylindrical part 22ᵇ which enters a socket in the bar and is tapped to receive the shank of a screw 53 entered from the under side of the bar. The head of the screw bears on a washer 54 and fits rotatably in a hardened bushing 55. It is set into the base of the guide far enough to take up looseness, but not to bind on the bar. The middle longitudinal line or element 22ᶜ of the post is in the axis of the screw and adjacent cylindrical surfaces.

It is sometimes necessary to effect a discontinuity of the grade, and then resume the prescribed grade in the course of cutting out a single pattern. This means that some parts of the pattern have to be enlarged or diminished from the model in a different ratio from the enlargement or reduction of other parts. For instance, if the top edge of the pattern for the quarter of a shoe is graded in the same ratio as other parts of the pattern, it will for some styles of shoe be too high in the enlarged sizes and too low in the reduced sizes. So when cutting that edge of the pattern, as well as other parts where similar conditions are found, the enlarged pattern is made less than proportionally larger than the model in such parts, by shifting the model guide inward (to the right in these drawings), which has the effect of causing the sheet material to be inserted further between the cutters, so that a strip of given width is, in effect, cut from the edge of the proportionally enlarged pattern. And the reduced pattern is made less than proportionally smaller than the model in the corresponding parts, by shifting the guide 22 outward, thus withdrawing the sheet material further from the cutters, and causing in effect, a strip of given width to be added to the proportionally reduced pattern. In either case after the part or parts referred to have been cut out the previous grading ratio is resumed by shifting the guide 22 back to the previous position. In order that, when so shifted, the guide may be located without loss of time in the correct positions, I have provided adjustable stops 56 and 57 on the rod 30 which carries the guide, cooperating with a fixed stop 58 connected with the rod holding guideway 29. With this guideway is associated a bar 60 which overlies a portion of the rod 30 and with which the stop 58 is connected. The stops 56 and 57 are slotted so that they can be placed on the rod 30 at any point, and they are secured by set screws 61. The stop 58 also has a set-screw 62 which may be used to clamp the guide in any selected position and immovable with respect to the holder 29. But when the stops 56 and 57 are used the screw 62 is loosened.

Then, when the operator desires to enlarge the dimension of any part of the pattern which he is cutting to more than the proportion established by the grade for which the machine is set, he slides the guide 22 forward until the stop 57 comes up against the fixed stop 58; and conversely when he wishes to reduce the pattern he slides the guide to the rear until the stop 56 abuts against the fixed stop. Rapid shifting and instantaneous correct locating of the guide in each position are thus made possible during the cutting out of a single pattern.

A further feature of the invention consists in provision for adjusting the index mark 40 or equivalent element on the guide carrying rod 30. In order that the pattern may be correctly graded to the desired size in the quickest and most efficient manner, it is necessary, of course, that the index 40 be at the correct distance from the guide pin 22 with reference to the scale 39 or its equivalent. To avoid the need of care in first locating the guide and placing the index, as well as to correct errors which may be made in respect to these members or those due to wearing of the parts, and to compensate for the thickness of a binding on the edge of the pattern, I have made the index adjustable by placing it on a block 63 which lies on the rod 30 and is provided with elongated holes 64 through which screws 65 pass into the rod. The slots 64 are made long enough to permit whatever adjustment of the index may be necessary to overcome any error which could occur within the limits of good workmanship. The index is permissibly a line cut or etched in the top face of the block, although it may be otherwise made.

Figure 2:
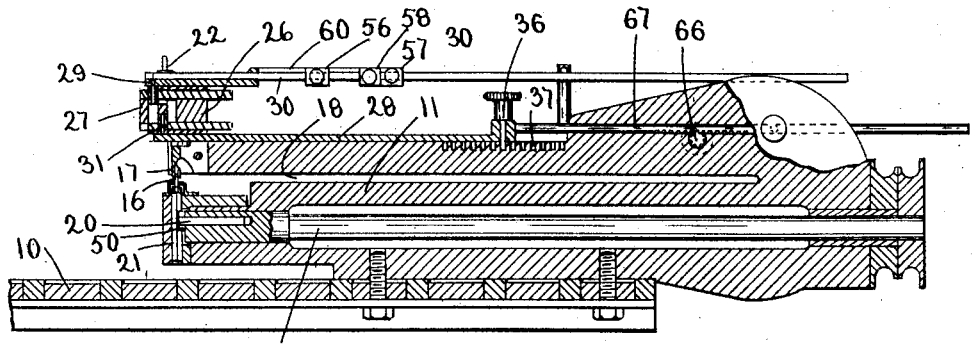
Figure 2 is a section of the cutter head and model guide with connecting parts, taken on approximately the line 2—2 of Figure 1, but representing the base line of the proportional motion mechanism as brought into the same line.

A further improvement made by this invention consists in means for adjusting the slide 28 betwen its fixed locations determined by the pin 36 and holes 37. This adjusting means comprises a shaft 66 rotatably mounted in the frame of the cutter head and having teeth which coact with rack teeth on a rod 67 secured to the slide 28 and passing through a guideway in the head, as shown in Figure 2.

In connection with the cutting mechanism I have provided other details not yet described. Over the punch or reciprocating cutter and under the die or stationary cutter is arranged a stripper 68 in which is a hole for the passage of the punch, and the function of which is to support the stock while the punch is being withdrawn therefrom. This stripper is secured to a plate 69 which rests on the holder for the punch carrier and is secured by a screw 70. A curved keyhole slot 71 enables the plate and stripper to be disengaged and reengaged by movements of rotation and displacement.

In the side of the die is a port 72 and in the die support is a channel 73 into which such port opens, providing open spaces for escape of the punchings.

By means of these improvements I have increased the output of the machine, improved the quality of the work turned out, made the machine more flexible and its adjustment easier with respect to its capacity for variation to suit different purposes, decreased the cost of the cutting instrument which is exemplified in the punch, made possible adjustment of the reciprocating cutter to exactly correct position, enabled looseness in its reciprocating carrier to be taken up, and simplified the task of the operator in traversing the model and work past the guide and cutting point, respectively. This last result has also increased the capacity of the machine for rapid production of work, and is contributed to by the swivel mounting of the model guide 22, for this mounting enables the guiding point to remain in exactly the same location with respect to the rest of the machine, even though the model be turned so that that edge which contacts with the guide extends at the point of contact with the guide otherwise than perpendicular to the center line of the cutter head. That is, the operator, in moving the edges of the model past the guide, has a wider latitude than he has had heretofore as to the inclination at which he may hold and move that edge which, at the moment, contacts with the guide; this is a convenience to the operator and makes his work less exacting, enabling him to increase his production. Then the use of a punch and die as cutting elements contributes to the same end because the character of the cut which makes the outline of the finished work is the same whether the edge of the model be inclined or perpendicular to the center line of the cutter head at the point of contact with the guide.

What I claim and desire to secure by Letters Patent is:

1. A pattern grading machine having a punch and a die as cutting elements and including a pantograph mechanism of which the stationary pivot is related to a given point in the cutting edges of the punch and die.

2. A pattern grading mechanism comprising a carrier for a model and pattern blank, a guide for the model, a proportional motion linkage connected to said carrier and guide and having a stationary pivot, and a punch and die couple for cutting the pattern blank, said stationary pivot being in alinement with a point in the cutting edges of the punch and die in certain conditions of operation.

3. A pattern grading mechanism comprising a carrier for a model and pattern blank, a guide for the model, a proportional motion linkage connected to said carrier and guide and having a stationary pivot, and a punch and die couple for cutting the pattern blank, said stationary pivot being in alinement with a point in the cutting edge of the punch and die in certain conditions of operation and being adjustable into different positions at predetermined fixed distances away from said point.

4. A pattern grading machine having a proportional motion grading mechanism for producing enlarged or reduced patterns from a model and having a punch and a die as cutting elements; a point in the cutting edges of said punch and die being the starting point of the proportional motion mechanism.

5. A pattern grading machine having a punch and a die as cutting elements and including a carrier for a model pattern and a sheet of stock, a guide for the model pattern, and a proportional motion mechanism relating the cutting elements, the guide and the carrier together, said guide being swiveled and having a guiding surface which passes through the swivel axis.

6. A pattern grading machine having a punch and a die as cutting elements and including a carrier for a model pattern and a sheet of stock, a guide for the model pattern, and a proportional motion mechanism relating the cutting elements, the guide and the carrier together, said guide being swiveled and having a guiding surface which passes through the swivel axis, said swivel axis being related to a given point in the cutting edges of the punch and die.

7. In a pattern grading machine, a cutter head having separated arms, a die mounted in one of said arms, a punch mounted in the other of said arms in cooperative alinement with said guide, a carrier for said punch reciprocatively mounted and being a bar of rectangular section, and a holder for said carrier having complemental V-shaped grooves together fitting said carrier.

8. In a pattern grading machine, a cutter head including a holder having a V-shaped groove, a cover detachably applied to one face of said holder and having a complemental V-shaped groove, a cutter carrier formed as a bar of rectangular section occupying said grooves, and a cutter element mounted on said carrier.

9. In a pattern grading machine, a cutter head including a holder having a V-shaped groove, a cover detachably applied to one face of said holder and having a complemental V-shaped groove, a cutter carrier formed as a bar of rectangular section occupying said grooves, and a cutter element mounted on said carrier, said cover being adjustable so as to take up looseness and wear of the carrier in said grooves.

10. A pattern grading machine having a cutter head, a shaft journaled in said head and protruding from one end thereof and having an eccentric crank element on said protruding end, a cutter holder mounted on said cutter head having an opening into which said eccentric projects and having a V-shaped groove or guideway in one face crossing said opening, a cover for said holder having a complemental V-shaped groove, and a cutter carrier fitting said grooves, said carrier having a notch in one angle adapted to receive said eccentric crank element.

11. In a pattern grading machine, a cutter head having arms adapted to receive a sheet of pattern stock between them, a cutter reciprocatively mounted on one of said arms, a cutting abutment mounted on the other arm, toward and away from which said cutter is movable, and a holder for the cutter mounted adjustably on the first arm and adapted to be shifted so as to bring the cutter into operative alinement with the abutment.

12. In a pattern grading machine, a cutter head having arms adapted to receive a sheet of pattern stock between them, a punch reciprocatively mounted on one of said arms, a die mounted on the other arm, toward and away from which said punch is movable, and a screw secured to the latter arm and having a head overlapping the die at the opposite end thereof from the punch, said screw being an adjustable abutment to resist the thrust of the die.

13. In a pattern grading machine, a cutter head having separated members adapted to admit a sheet of stock between them and being otherwise rigidly related to one another, complemental punch and die elements mounted on said members, one of which elements is reciprocative toward and away from the other, means for so moving such reciprocative element, and an abutment for the complemental element adjustable in the line of such reciprocative movement and overlapping a part of the said element to resist its displacement under thrust of the reciprocative element.

14. In a pattern grading machine, a cutter head having separated and rigidly related members adapted to receive a sheet of pattern stock between them, punch and die elements one of which is fixed in one of said members and the other element is reciprocatively mounted in the other member, such reciprocative element being arranged to cooperate with the fixed element in punching the interposed stock, the member which holds the fixed element being recessed and slotted to receive and clamp said element, said element being adjustable in said member toward and away from the reciprocative element, and an abutment overlapping a part of said adjustable element and being correspondingly adjustable.

15. In a pattern grading machine, a cutter head, a drive shaft mounted in said head, a cutter carrier and a holder for said carrier having a guideway in which the latter is reciprocative, said holder being detachably mounted on the cutter head and constructed to hold said carrier adjacent to and crossing the end of said shaft, the shaft and carrier having complemental engaging means constructed to impart reciprocatory movement to the carrier from rotation of the shaft.

16. In a pattern grading machine, a cutter head, a drive shaft rotatably mounted in said head and protruding from the end thereof, a cutter holder mounted on said head across the end thereof through which said shaft protrudes and having an angular portion overlying a side of the head and provided with open slots for the reception of clamping screws, a cutter carrier reciprocatively mounted in said holder in a path crossing the axis of the shaft and having a notch, an eccentric pin on the end of said shaft entering the said notch to impart reciprocating movement to the carrier, and screws passing through the slots in said holder into the cutter head and adapted to clamp the holder on the head.

17. In a pattern grading machine, the combination with a cutter head, complemental cutting instruments arranged to admit a sheet of pattern stock between them and operable to cut such stock, a jack adapted to hold a model pattern and a sheet of stock and being movable to project such stock between such instruments, a guide for the model pattern, and a proportional motion mechanism connecting said jack and guide with the cutter head, of means for adjustably connecting the model guide with said proportional motion mechanism and including complemental stops for limiting the adjustment of said guide.

18. In a pattern grading machine having cutting means, a jack for holding a model pattern and a sheet of pattern stock and proportional motion mechanism, a guide for the model pattern, a holder in which said guide is adjustably mounted, which holder is connected to a member of said mechanism, and a rod to which the guide is secured, said guide having a stop, and said rod having complemental stops on respectively oppposite sides of the first-named stop for limiting the adjustments of the guide.

19. In a pattern grading machine having a proportional motion mechanism and a block forming a part of said mechanism for the purposes set forth, a holder pivoted to said block and having a guideway, a rod longitudinally movable in said guideway, a pattern guide secured to said rod, stops secured to said rod and adjustable to different positions longitudinally thereof, and a complemental stop between the aforesaid stops rigidly connected with said holder.

20. In a pattern grading machine having a proportional motion mechanism, a block forming a part of said mechanism, a model pattern guide, and means connecting said guide to said block consisting of a holder carried by the block and a sliding bar adjustably carried by said holder and to which the guide is secured, the holder and bar having complemental indices for determining the position of the guide, the index on one of said parts being adjustable longitudinally of the other part.

21. In a pattern grading machine having a proportional motion mechanism, a block forming a part of said mechanism, a model pattern guide, and means connecting said guide to said block consisting of a holder carried by the block and a sliding bar adjustably carried by said holder and to which the guide is secured, the holder having a line of graduations and the bar having an index cooperating with said graduations for determining the setting of the guide, such index being adjustable on the bar toward and away from the guide.

22. In a pattern grading machine having a proportional motion mechanism, a block forming a part of said mechanism, a model pattern guide, and means connecting said guide to said block consisting of a holder carried by the block and a sliding bar adjustably carried by said holder and to which the guide is secured, the holder having a series of graduations and the bar having an adjustable block on its exposed surface beside said graduations, said block being adjustable toward and away from the guide and having an index cooperating with said graduations.

23. In a pattern grading machine, a cutter head, a jack carrying a model pattern and a sheet of pattern stock, a guide for said model pattern, a proportional motion mechanism pivoted to the cutter head and coupled with said jack and model guide, a slide adjustably mounted on the cutter head to which the pivot of said mechanism is secured, and means for adjusting said slide comprising a series of teeth connected therewith and a rotatable gear element mounted in the head and coacting with said teeth.

24. A pattern grading machine having a cylindrical die and a complemental punch as the cutting elements, together with a holder for a model pattern and a sheet of stock, a guide along which the edges of the model pattern are traversed, and proportional motion mechanism connecting the said holder with the cutting means and guide.

25. A pattern grading machine comprising a cutting couple consisting of a punch and die operating in a normally fixed and stationary location, a pattern guide movable in a constrained path having a definite relation to said cutting couple, a holder for a model pattern and a sheet of stock, and a proportional motion mechanism coupled to a stationary part of the machine and to said holder and said guide, being constructed to impart to the guide motions proportional to the movements of said holder toward and away from the cutting couple.

26. In a pattern grading machine a cutting couple comprising a stationary tubular die, a reciprocatively mounted punch in alinement with said die adapted to enter one end thereof and to withdraw, means for supporting and guiding said punch, and a stripper mounted in fixed position on said supporting means between the die and the withdrawn position of the punch and having a hole through which the punch is adapted to pass.

27. In a pattern grading machine a cutting couple comprising a stationary tubular die, a reciprocatively mounted punch in alinement with said die adapted to enter one end thereof and to withdraw, means for supporting and guiding said punch, and a stripper mounted on said supporting means between the die and the withdrawn position of the punch and having a hole through which the punch is adapted to pass, said stripper having a supporting plate containing a keyhole slot, and a screw securing said plate to the punch support and having a head smaller than the wide part and wider than the narrow part of said keyhole slot, the shank of the said screw passing through the slot.

28. In a pattern grading machine cutting means comprising complemental punch and die elements, one of which is reciprocative toward and away from the other, a holder for said reciprocative element in which the latter is movable to perform its cutting functions, a support for said holder, and means for securing said holder to said support with provisions for adjustment of the holder transversely to the path of movement of said reciprocative element.

29. In a pattern grading machine cutting means comprising complemental punch and die elements, one of which is reciprocative toward and away from the other, a holder in which one of said elements is mounted, a support for said holder, and means for securing said holder to said support with provisions for adjustment of the holder and the cutting element held thereby in a direction transverse to the path of movement of the reciprocative cutting element.

30. In a pattern grading machine cutting means comprising complemental punch and die elements, one of which is reciprocative toward and away from the other, and supporting means for the respective elements having provisions for adjusting one of said elements transversely to the path in which said reciprocative element moves, and provisions for adjusting the other element longitudinally of said path.

31. In a pattern grading machine cutting means comprising complemental punch and die elements, one of which is reciprocative for the performance of the cutting function, and holding means having a guideway in which said reciprocative element is confined and guided in its prescribed path, a drive shaft, and motion transmitting means between said shaft and said reciprocative element for imparting reciprocating movement to the latter.

32. In a pattern grading machine cutting means comprising complemental punch and die elements, one of which is reciprocative for the performance of the cutting function, holding means having a guideway in which said reciprocative element is confined and guided in its prescribed path, a support for said holding means on which the latter is mounted with provision for adjustment transversely to said path, a drive shaft, and transmission means for imparting reciprocative movement to said element from said shaft, in all the operative adjustments of said holding means and reciprocative element.

33. In a pattern grading machine the combination of cutting means, a model and stock holder, a guide for the model, and proportional mechanism connecting said cutting means, holder and guide, said guide being shiftable independently of the proportional mechanism for temporarily effecting discontinuity of the grade during operation of the machine.

34. In a pattern grading machine the combination of cutting means, a model and stock holder, a guide for the model, proportional mechanism connecting said cutting means, holder and guide, said guide being shiftable independently of the proportional mechanism for temporarily effecting discontinuity of the grade during operation of the machine, and means arranged for limiting such displacements of the guide.

35. In a pattern grading machine the combination of cutting means, a model and stock holder, a guide for the model, proportional mechanism connecting said cutting means, holder and guide, said guide being shiftable independently of the proportional mechanism for temporarily effecting discontinuity of the grade during operation of the machine, and adjustable limit abutments for arresting in a predetermined location the guide when so shifted.

In testimony whereof I have affixed my signature.

MARSHALL V. PRESTON.